Jan. 5, 1965 F. G. BUHRENDORF 3,164,675

DATA TRANSMISSION SYSTEM

Filed Nov. 21, 1961 4 Sheets-Sheet 1

INVENTOR
F. G. BUHRENDORF
BY J. P. Kearns, Jr.
ATTORNEY

INVENTOR
F. G. BUHRENDORF
BY J. P. Kearns, Jr.
ATTORNEY

INVENTOR
F. G. BUHRENDORF
BY J. P. Kearns, Jr.
ATTORNEY

INVENTOR
F. G. BUHRENDORF
BY J. P. Kearns, Jr.
ATTORNEY 3,164,675

DATA TRANSMISSION SYSTEM

Frederick G. Buhrendorf, Colts Neck, N.J., assignor to Bell Telephone Laboratories, Incorporated, New York, N.Y., a corporation of New York Filed Nov. 21, 1961, Ser. No. 153,920
15 Claims. (Cl. 178—66)

This invention relates in general to frequency-modulation communications systems and in particular to the transmission and reception of two-state frequency-modulation signals by electromechanical means.

Among the many communications services available today, none is attracting more attention and receiving more investigative effort than the transmission and reception of binary digital data. The handling of huge volumes of data is becoming ever more necessary in business and banking, industrial process control, weapons tracking and guidance and scientific research. In most of these cases data generated by a machine in one geographical location is intended for utilization by a machine in another geographical location. A universally available transmission medium is desirable for effecting data transfers between machine locations. Such a widely available communications medium exists in the public switched telephone network. This widely available network, however, is primarily adapted to the transmission of human speech which has etirely different transmission characteristics from data in its baseband form. The real problem is the translation of baseband data into a form having transmission characteristics suitable for transmission over telephone networks.

Many electronic systems have been suggested for translating data into amplitude-, frequency-, and phase-modulated signals occupying a bandwidth compatible with the transmission characteristics of the telephone line. Generally these electronic systems require entirely different sets of components for transmission and reception with the receiver components usually exhibiting a higher order of complexity that the transmission components.

It is an object of this invention both to transmit and receive digital data by largely non-electronic means.

It is another object of this invention to effect both transmission and reception of digital data with the same basic apparatus.

It is still another object of this invention to accomplish parallel-to-serial and serial-to-parallel conversion of whole data characters in the same apparatus which generates and detects the transmitted signal.

It is yet another object of this invention to generate and detect a bistate frequency-modulation line signal by non-electronic means.

According to this invention a plurality of fixed magnetic recording devices are disposed along a moving magnetizable surface. To a first pair of these recording devices an alternating current is applied in such a way as to impress on the magnetizable surface a saturated pattern representative of a first frequency which may be designated a spacing frequency. Others of the recording devices are wired in groups so that when pulsed by a direct-current representative of a marking message signal element alternate north and south magnetic poles are produced to erase the spacing frequency pattern and to impress a new magnetic pattern on the magnetizable recording surface indicative of a second frequency which may be designated a marking frequency. The second frequency is determined by the speed of the recording surface and the spacing between the recording devices. If adjacent groups of four devices are pulsed and not pulsed according to the digits in a binary word, the magnetic pattern imprinted on the recording surface is equivalent to a succession of first and second frequencies corresponding to the marks and spaces in the binary word. A reproducing magnetic device is positioned following the desired number of printing groups and adjacent to the recording surface which has induced in it alternating voltages corresponding to the marking and spacing frequencies. This device is coupled to a transmission line.

Effectively, according to this invention, the above-described arrangement constitutes a combined parallel-to-serial signal converter and bistate frequency-shift modulator. The number of groups of recording devices may correspond to the number of bits in a binary word. One or more of the groups may be used to generate a start signal.

According to another aspect of this invention the same structure described above as a frequency modulator may be adapted to serve as a combined serial-to-parallel converter and frequency demodulator. The leads to the grouped magnetic devices are used as parallel signal outputs and one or more as required are used as start code detectors. The reproducing device formerly used as an output device is converted to an input device coupled to the transmission line. If the speed of the magnetic surface is arranged to be the same at both modulator and demodulator, the magnetic pattern impressed on the moving recording surface at the demodulator will exactly correspond to that impressed on the recording surface at the modulator. Upon detecting an output from the start code detectors the potentials on the remaining groups are sampled. The magnetic pattern corresponding to the marking frequency induces a maximum output in the proper grouped magnetic devices. A reduced or no output is induced in the grouped devices where the magnetic pattern corresponds to the spacing frequencies. The ratio between the marking and spacing frequencies can be chosen so that the spacing frequency induces no net output.

Further according to this invention the structure for both modulator and demodulator may be embodied in a synchronous dynamo having a cylindrical rotor surfaced with a magnetizable material and a multipolar stator provided with a plurality of individual windings covering groups of two and four poles each. The two-pole windings serve as line input and output and space frequency input windings. The four-pole windings serve as message data bit and start bit input and output points. All poles are uniformly spaced and the spacing between poles, together with the rotor speed, determines the marking frequency. When both transmitter and receiver dynamos are driven by synchronous motors powered by commercial sixty-cycle mains, no synchronization signals are needed between transmitting and receiving locations because of the precise control maintained at commercial power stations. Because the only wiring connections are made to the stator, there are no rubbing parts, slip rings, commutators or brushes.

It is a feature of this invention that the same mechanical structure can be used as either a frequency modulator or a frequency demodulator.

It is a further feature of this invention that the functons of parallel-to-serial conversion, frequency modulation and timing are all accomplished in a single unitary apparatus.

It is another feature of this invention that the same frequency that serves as the spacing frequency also serves to erase previous impressions on the recording surface.

It is a still further feature of the invention that the frequency-shift signal generated by electromechanical means can be applied directly to a telephone transmission line without amplification.

Other objects and features of this invention will become apparent from the following description taken in connection with the accompanying drawings in which—

Figure 3:
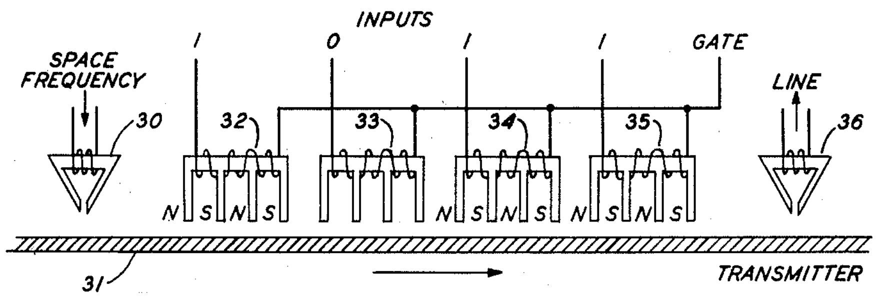
FIG. 3 is a diagrammatic representation of an electromechanical transmitting system according to this invention for generating a two-frequency serial line signal from a parallel input data signal.
Figure 5:
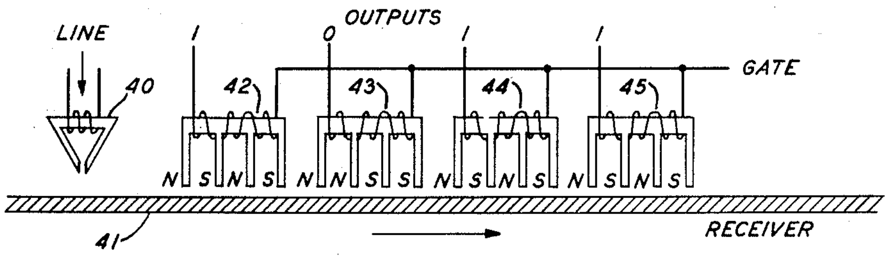
Figure 6:
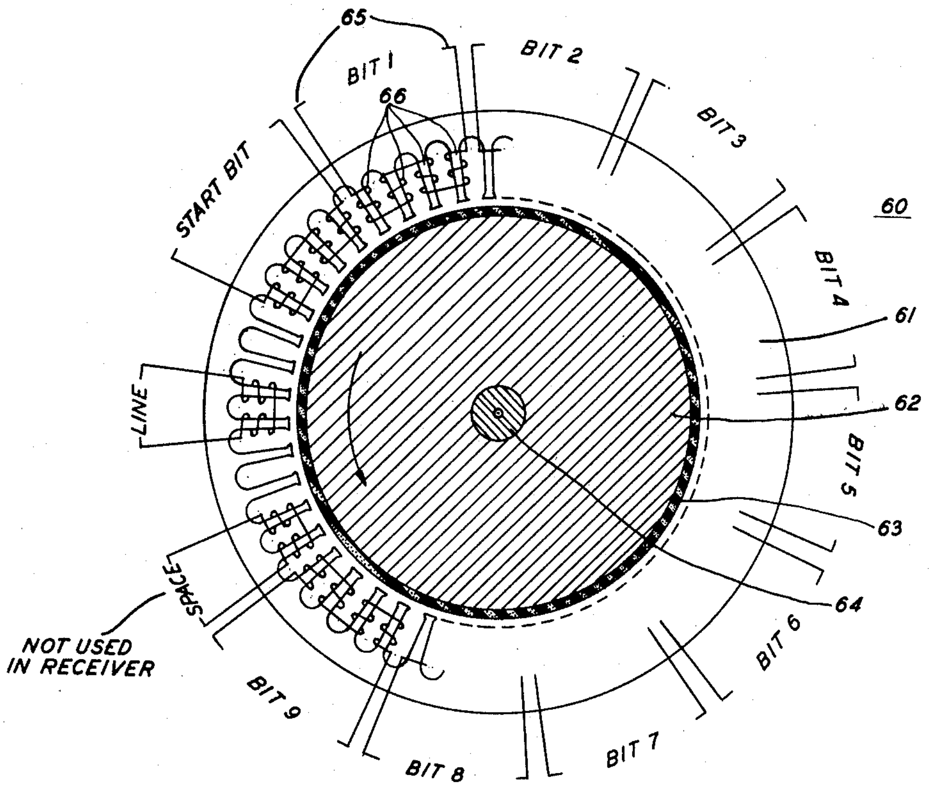
Figure 7:
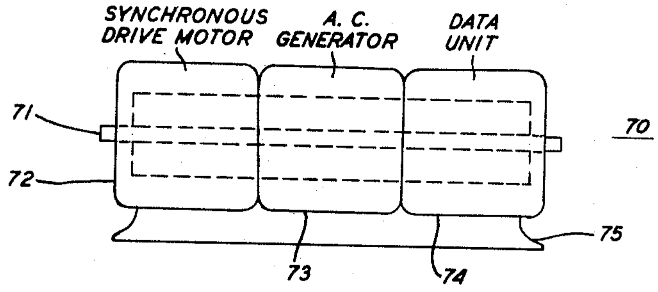
Figure 8:
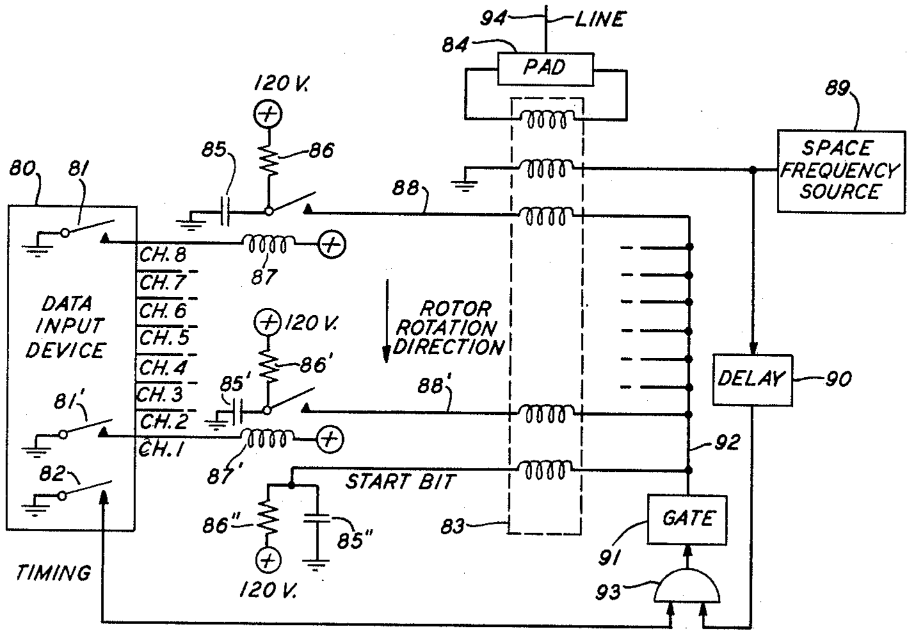
Figure 9:
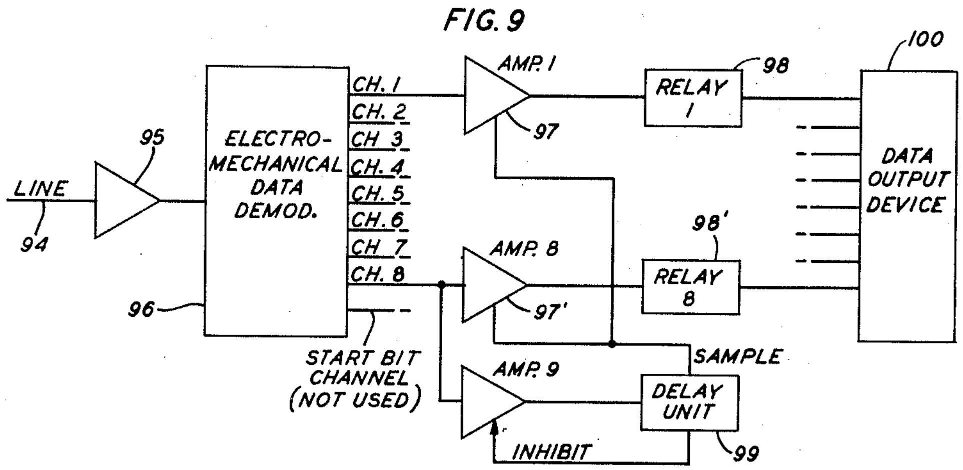

FIGS. 4*a*, 4*b* and 4*c* are waveform diagrams illustrative of the magnetic pattern set up in the magnetizable surface of the drum used in the practice of this invention;

FIG. 5 is a diagrammatic representation of an electromechanical receiving system according to this invention for recovering a parallel data signal from the two-frequency line signal generated by the apparatus of FIG. 3;

FIG. 6 is a diagrammatic representation of the hysteresis motor-type structure found in an illustrative embodiment of this invention;

FIG. 7 is a diagram of a transmitter unit in which this invention may be embodied;

FIG. 8 is a block schematic diagram of an illustrative embodiment of a complete data transmitter according to this invention; and FIG. 9 is a block schematic diagram of an illustrative embodiment of a complete data receiver according to this invention.

Figure 1:
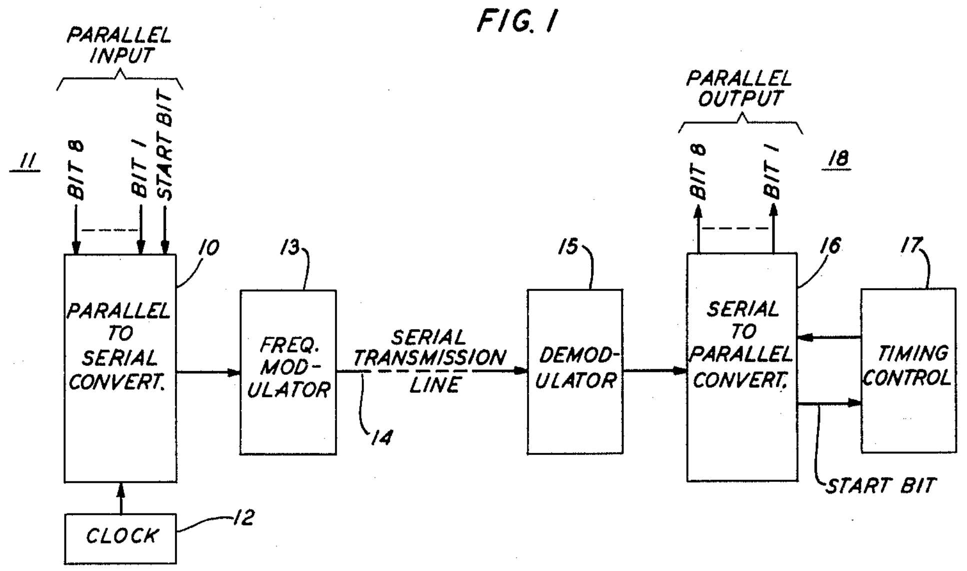
FIG. 1 is a block diagram of a conventional parallel-to-serial data transmission system using an electronically generated frequency-modulated signal on the transmission line.

A block diagram of a typical frequency modulation electronic data transmission system is shown in FIG. 1. A multibit parallel data signal at location 11 is to be transmitted over a serial transmission line 14 to a remote location 18 and restored there to parallel form. The parallel input signal, comprising in each character, for example, eight switch closures and openings as determined by the particular message character, is applied to a parallel-to-serial converter 10. Converter 10 may comprise a shift register having a number of bistable stages equal to, or exceeding, the number of bits in a parallel message character. A start bit signal usually accompanies each parallel message character as indicated to alert the receiver to the presence of each complete message character. A clock source 12, operating at a constant rate, controls the shifting rate of register 10. It may be arranged to have the start bit gate the clock to the converter for each message character. Under the control of clock 12 the message character stored in the converter is released in serial fashion to frequency modulator 13.

Modulator 13 is preferably a two-frequency generator of any well known form. A pulse or no-pulse from the converter causes the modulator to deliver a corresponding marking or spacing frequency to line 14. Line 14 may be a telephone transmission line incapable of transmitting direct-current signals because of the presence of repeaters or for other reasons. Therefore, the frequency-shift signals are chosen to lie within the passband of the transmission line.

The line signal at the remote location is applied to a frequency demodulator or discriminator 15, which may assume any form well known in the art. The demodulator detects the frequency-shift signals and produces direct-current pulses and no pulses according to whether the bits of the message were marking or spacing. Serial-to-parallel converter 16 stores the message bits in separate bistable stages and under the control of timing control 17 gated by the start bit delivers a parallel output corresponding to the individual message character bits. Timing control 17 may be similar to clock source 12. Timing control 17 need not operate in exact synchronism with clock 12, but it must be fairly close in frequency. In some systems it may be desirable to synchronize the two sources in which case additional synchronizing signals must link the two timing sources as by a separate timing channel not shown here. There exist timing recovery systems that operate in the manner of a flywheel whereby timing can be recovered directly from the message signal.

The electronic frequency modulation system requires many separate functional units corresponding to the blocks of FIG. 1. The converters include separate bistable stages. The modulator requires separate frequency sources or reactance control of a single oscillator. The demodulator requires tuned circuits corresponding to the marking and spacing frequencies plus rectifiers to obtain a direct-current output. Special synchronizing circuits are also necessary.

All these complications are obviated in the electromechanical frequency-modulation system of this invention.

Figure 2:
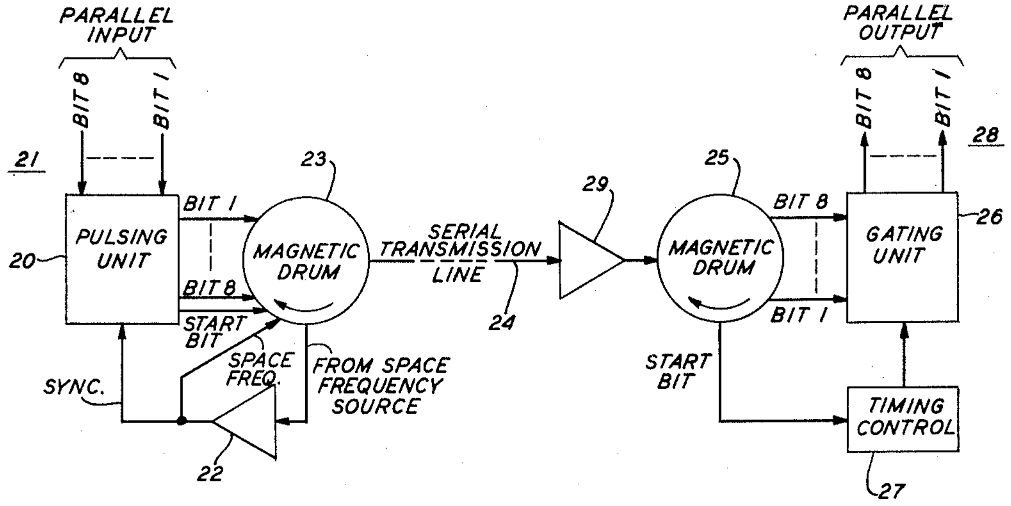
FIG. 2 is a block diagram of a parallel-to-serial data transmission system using a magnetic drum to generate the frequency-modulated line signal according to this invention.

FIG. 2 is a block diagram of electromechanical system employing electromagnetic transducers. Message characters in parallel bit form are to be transmitted from location 21 to location 28 over a serial transmission line 24. Moving magnetizable media 23 and 25 at each location are employed to perform the dual functions of parallel-to-serial and serial-to-parallel conversion and frequency-shift modulation and demodulation.

At the sending location the magnetizable medium shown at 23 as a magnetic drum for convenience can be any continuously moving magnetic surface such as a tape or a drum. Pulsing unit 20 serves only to transform the switch closures from the data source into pulses of sufficient amplitude to saturate the magnetizable surface. The connection of each bit lead from the pulsing unit can be to magnetic recording heads which have alternate north and south poles so that depending on the speed of motion of the magnetic surface a pattern representative of a unique marking frequency is impressed thereon. A start bit is generated in a similar manner through an additional group of recording heads properly spaced. A differently arranged set of magnetic heads of alternate polarization can be set adjacent to the moving magnetizable surface and energized from a direct-current source (not shown) to generate another frequency corresponding to a space frequency. This frequency can be amplified in amplifier 22 to a suitable level and reapplied to the magnetizable surface through a single recording head to saturate the magnetic surface with a pattern corresponding to the space frequency and at the same time erase any other patterns stored from a previous message character. In the event that it is inconvenient for practical reasons to generate the space frequency directly by electromechanical means, a subharmonic may be used. Then amplifier 22 is assumed to include appropriate frequency multiplying means.

When all the bit leads are selectively pulsed at one time according to the message character code, and in synchronism with a space frequency transition, those leads actually pulsed erase the space frequency pattern and impress the marking frequency pattern on the magnetic surface and those not pulsed leave the spacing frequency pattern undisturbed. A reproducing head connected to the transmission line is placed next to the magnetic surface at an arbitrary position beyond the bit recording head. Therefore, an electrical signal is impressed on the line 24 which consists of successive mark and space frequency waves representative of the message character.

At the receiving end of the system a similar magnetic drum or tape 25 has arranged around it a plurality of reproducing heads and a single recording head. The receiver magnetic surface is arranged to run at the same speed as the transmitting surface 23. The recording head is coupled to line 24 through an amplifier 29 to produce a signal of sufficient amplitude to saturate the magnetic surface. The receiver magnetic surface is magnetized in a pattern representative of the marking and spacing frequencies of the message. The bit reproducing heads are spaced in the same manner as the bit recording heads at the transmitter.

The start bit is first detected and activates timing control 27, which may be a simple delay unit. The delay is established to open the gating unit 26 at the instant the proper magnetic patterns arrive under the bit reproducing heads. Since the bit recording and reproducing heads at transmitter and receiver are similarly spaced the marking frequency magnetic patterns will induce electrical pulses in the appropriate reproducing heads, but the spacing magnetic patterns will not exhibit the proper phases to induce electrical pulses of the same amplitude as the marking pulses. From the gating unit the message pulses may be converted to a form at location 28 by conventional means to operate paper tape punches or other utilization devices.

Figure 4:
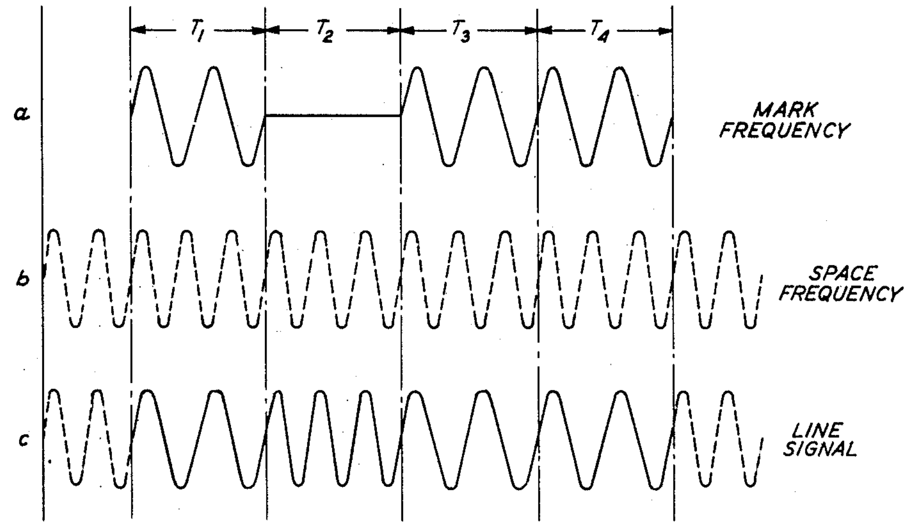

FIGS. 3, 4 and 5 serve to illustrate the principle of this invention more clearly. In FIG. 3 an electromechanical transmitter for four-bit characters is shown schematically. A magnetizable material 31, shown cross-hatched, moves from left to right at constant speed past a plurality of magnetic heads. Heads 30 and 36 may be conventional single heads for impressing the space frequency on the magnetic surface and for reproducing a line signal, respectively. Heads 32 through 35 are bit-recording heads each having, for example, four poles. They can be of special design as shown or they can be paired standard heads with windings oppositely wound on alternate pole pairs as shown and uniformly spaced. The input leads extend to data input equipment such as a tape reader. The coils are wound on the heads so as to induce alternate north and south poles. Marking inputs indicated by the one's are applied to heads 32, 34 and 35. A spacing input indicated by zero is applied to head 33. A common lead from all windings goes to a gating input, which can be merely a ground connection when the gate is open.

The spacing frequency input at head 30 erases all prior patterns on the magnetic surface and impresses a pattern representative of a spacing frequency. When the gating input in synchronism with a space frequency transition is supplied to the bit-recording heads alternate north and south magnetic poles appear as shown. The spacing frequency is erased under these heads and replaced by a marking frequency pattern determined by the spacing of the individual poles and the speed of the magnetic surface. Since head 33 is not pulsed no poles are induced and the spacing pattern remains unaffected. As the magnetic surface passes the line reproducing head 36 an electrical signal corresponding in frequency to the respective magnetic patterns is induced in the line.

FIG. 4 is a waveform diagram illustrative of the state of the magnetic pattern under the respective recording heads. Time intervals $T_1$ through $T_4$ are indicated to correspond with the respective recording heads 32 through 35. FIG. 4(*b*) shows, by dashed lines, the uniform spacing frequency pattern laid down by head 30. For practical reasons the spacing frequency was chosen as one and a half times the marking frequency. Therefore, three cycles of the spacing frequency are shown in each time interval. FIG. 4(*b*) is diagrammatic of the magnetic pattern in surface 31 if no message character were being transmitted.

FIG. 4(*a*) shows the magnetic pattern impressed on a clean surface by pulsing the recording heads according to a 1011 message character. Head 33 is not pulsed and therefore time slot $T_2$ has no magnetic pattern change. Since there are two pairs of poles per recording head, and the spacing of each pair corresponds to a half wavelength, two cycles of the marking frequency are laid down under each pulsed head.

FIG. 4(*c*) shows the resulting line signal as induced in reproducing head 36. It is seen to comprise two cycles of marking frequency in each of time slots $T_1$, $T_3$ and $T_4$ and three cycles of spacing frequency in time slot $T_2$. The choice of marking and spacing frequencies in a 3/2 ratio as here results in smooth transitions between successive marks and spaces.

FIG. 5 shows diagrammatically how the receiver is arranged. Moving magnetic surface 41 (cross-hatched) passes a plurality of reproducing heads 42 through 45 at the same speed as the magnetic surface at the transmitter. A conventional recording head 40 is coupled to the line as shown. Reproducing heads 42 through 45 are of the same construction and spacing at the recording heads at the transmitter. The winding used to inject the space frequency is not needed. The coils on the reproducing windings have a common lead connected to a gate input.

In operation the line signal produces a magnetic pattern on the magnetic surface 41. At the instant the pattern is properly situated under the reproducing heads, the gate is opened. Assuming that the line signal is that shown in FIG. 4(*c*), magnetic poles are induced in the reproducing heads in such a way as to be additive on heads 42, 44 and 45 so that electric pulses are obtained from these heads. Since the spacing frequency is not in phase with the pole spacing of the reproducing head, alternate north and south poles do not result and therefore no electrical pulse is induced in the coil. This illustrates another advantage of choosing the marking and spacing frequencies in the ratio of 3/2.

In the examples described above for illustrative purposes difficulties are encountered in obtaining and maintaining proper spacing between the bit transducers, the proper air gap between transducers and magnetic surface and synchronism between transmitter and receiver. It has been discovered that these disadvantages can be minimized by utilizing the magnetic structure of an induction motor stator to produce the magnetic fields suitable for recording on a magnetic drum which can then be made similar to the rotor of a hysteresis synchronous motor. The usual slotted stator of an induction motor contains all the elements of a magnetic recording or reproducing head in each pairs of adjacent poles. There are a north and south pole and an air gap in between. A single coil can be wound on any pair desired. In addition, adjacent groups of four poles can be wound in series as illustrated in FIGS. 3 and 5, to effect a bit recording or reproducing head. The rotor can be smoothly machined to form a magnetic drum and the air gap adjusted once and for all.

Proper selection of the number of poles and slots in the stator allows any number of parallel bits within reason to be transmitted at one time. Both transmitting and receiving machines can be driven by a synchronous motor from the commercial mains. Since commercial power supplies are well regulated because of the universal use of electric clocks, there is no synchronization problem between transmitter and receiver, at least in the United States where 60-cycle power is standard throughout.

FIG. 6 illustrates a 48-pole station lamination on which a maximum of nine 4-pole message bit windings, one 4-pole start bit winding, a two-pole space frequency and erase winding and a two-pole line winding can be wound. Reference character 60 represents one such stator lamination. A complete stator structure includes a plurality of stacked laminations. Rotor 62 on shaft 64 has a smooth magnetic surface of an iron-cobalt-nickel alloy, for example, and rotates at a synchronous speed of 3600 revolutions per minute.

Each recording or reproducing winding encompasses four adjacent poles such as those designated 66. Four poles are used to produce two cycles per bit. More poles per bit can be used if desired. Two poles per bit could be used but only at the expense of detection difficulties due to the fact that there would be only one cycle per bit of the marking frequency. Coil 65 is wound alternately clockwise and counterclockwise on adjacent poles so that a single pulse either creates alternate north and south poles or is induced when alternate north and south poles result from the magnetic pattern on rotor 62. The line and space windings require only two poles each and unused poles isolate the line winding from message and space frequency windings.

A 48-pole structure such as is illustrated in FIG. 6 and having a rotor turning at 3600 r.p.m. will produce a marking frequency of 1440 cycles per second. A space frequency of 2160 cycles per second may then be conveniently supplied to preserve the 3/2 ratio desired. This may be generated externally. A maximum bit speed of 720 per second is attainable (two cycles of a wave of 1440 cycles per second per bit). Pole spacing is fixed and uniform. Identical units are used at both transmitter and receiver.

Other configurations are possible. For example, a 64-pole stator and a rotor at 1800 r.p.m. will handle up to 13 parallel bits at a marking frequency of 960 cycles per second and at a maximum bit speed of 480. A spacing frequency of 1440 cycles is then suggested. A 24-pole stator with a 3600-r.p.m. rotor will similarly handle three parallel bits at 360 per second on a marking frequency of 720 cycles and a spacing frequency of 1080 cycles. Other ratios of spacing to marking frequencies, such as, 5/2, 7/2, etc. can be used and still obtain a null in the detector at the spacing frequency. For telephone line transmission the 2160-cycle spacing and 1440-cycle marking frequencies used in the examples occur at points of approximately equal delay distortion.

A complete transmitter unit may use a common housing with a drive motor and an alternating-current generator for the space frequency. The complete structure is indicated generally by reference character 70. It includes a common base 75 and a common shaft 71. The motor 72 is a conventional 24-pole hysteresis induction motor. Driven from the 60-cycle mains a speed of 3600 r.p.m. is obtained. Generator 73 is a conventional synchronous generator having 24, 30, 36 or 48 poles as necessary for generating the space frequency. In general, the space frequency is too high to be generated directly because of limitations on the number of poles that can conveniently be provided in a single structure. However, with a 36-pole stator and a 3600-r.p.m. rotor a 1080-cycle frequency can be generated and a frequency doubler can be placed between the generator and the space winding on the data unit. A full-wave rectifier and a low-pass filter will serve adequately. Data unit 74 has appropriate laminations in its stator as shown in FIG. 6. The common rotor shaft assures synchronization between marking and spacing frequencies.

FIG. 8 is illustrative of a practical transmitter circuit with auxiliary keying apparatus for an eight-bit parallel system. Reference character 80 indicates a data input device such as a paper tape reader which produces a plurality of parallel switch opens and closures for each message character. Eight bits per character are assumed here. Two message bit switches 81 and 81' are shown schematically as selectively placing grounds on the appropriate channel output leads. A timing switch 82 is also shown. This latter switch operates for each message character.

The stator coil structure is represented diagrammatically by dashed-line box 83. There is shown an individual coil for each of the message bit windings, the start bit winding, the space frequency winding and the line winding. Interposed between the stator windings and the data input device are a group of relays such as those marked 87 and 87' controlled by the switches in data input device 80. A reasonably high potential is necessary to cause a saturation current to flow in the stator windings. Therefore, each relay circuit includes a capacitor, such as 85, and a resistor, such as 86. When the relay contacts are open the capacitor charges through the resistor from the potential source marked 120 volts. When the relay operates the capacitor can discharge through the associated stator coil.

One side of each of the stator bit windings is connected in common to a gate circuit 91 through lead 92. The gate circuit supplies a ground to the common lead when open. The gate is opened upon the concurrence at coincidence circuit 93 of a ground on the timing lead and a negative half-cycle of the space frequency through delay means 90. The start bit circuit does not require a relay because it is in operation on every gate opening in synchronism with the closing of timing contact 82. A resistor 86'' and capacitor 85'' together with a potential source as shown are required for the start bit circuit.

Space frequency source 89 may be any convenient source, but is preferably an electromagnetic generator on a common shaft with the data unit as indicated in FIG. 7. Delay circuit 90 is used to synchronize the marking and spacing frequency transitions as indicated in FIG. 4(*c*). The line stator winding is connected to the transmission line 94 through an impedance-matching pad 84 as shown.

FIG. 9 illustrates diagrammatically a practical electromechanical receiver circuit according to this invention. The two-frequency line signal incoming on line 94 is amplified in amplifier 95 to a level which will saturate the rotor of the rotating data units indicated generally by reference character 96. The receiving data unit is identical to the transmitting data unit except that the space frequency generator is unnecessary. The line input winding is a two-pole winding as previously indicated. The input signal must be of sufficient amplitude to erase the previous magnetic pattern. The output leads marked channels 1 through 8 are connected to four-pole windings within demodulator 96. Gated amplifiers, such as 97 and 97', are connected to each channel lead.

A start bit detector circuit is necessary in order to determine when to gate the several channel outputs simultaneously to obtain the parallel output data signals. The start bit winding is not used for a practical reason. The start bit always at the marking frequency arrives first and if all the gates were held closed until the start bit reached the start winding, there would be insufficient time to open the gate circuits to detect the message bits. Therefore, the start bit is detected in channel 8 through auxiliary amplifier 9 which then operates delay unit 99. The delay unit is adjusted initially to produce an output on the sample lead, which connects to all channel amplifiers 97, at the instant when the rotor pattern is properly aligned with the stator coils. An additional inhibit output is provided from delay unit 99 for the purpose of preventing amplifier 9 from operating for a minimum interval equal to the duration of a message character after a start bit is detected.

Amplifiers 1 through 8 control relays 1 through 8 such as those designated 98 and 98' to provide switch closures to data output device 100. Output device 100 may be a conventional data reproduction means such as a paper tape punch.

Since the stator coils on both transmitter and receiver data units can be interchanged in function, it will be obvious to one skilled in the art that a switching system (not shown) can readily be devised to enable half-duplex or alternate two-way transmission between stations utilizing the electromechanical data units of this invention.

While this invention has been set forth above in terms of specific embodiments, it will be apparent to those skilled in the art that many modifications and adaptations are possible within the scope of the appended claims.

What is claimed is:

1. A frequency-shift data transmission system comprising a transmission line joining two geographically separated points, a source of parallel data bit message characters at one end of said transmission line, a sink for parallel data bit message characters at the other end of said transmission line, means for transferring data bits in serial form between said source and said sink over said transmission line, said means comprising at each end of said transmission line a continuously moving magnetizable surface, each of said surfaces moving at the same speed, an electromagnetic transducer coupled to each end of said transmission line and located adjacent to said moving surfaces to serve respectively as line signal reproducing and recording devices, a further plurality of electromagnetic transducers adjacent to each of said moving surfaces and coupled to individual data bit channels in said source and said sink, the spacing of said plurality of transducers being equal to half the wavelength of a first frequency transmittable over said transmission line, a space frequency source at the one end of said transmission line, an additional electromagnetic transducer adjacent to the moving surface following the associated line transducer at the one end of said transmission line for impressing said space frequency on said moving surface, and gating means coupling said further plurality of transducers adjacent the moving surface at the other end of said transmission line to said data sink whenever a complete message character is received.

2. A frequency-shift data transmission system comprising a transmitter, a transmission line, a receiver, said transmitter comprising a hysteresis dynamo structure including a multipolar field structure and a smooth rotor coated with a magnetizable surface and rotating at a fixed speed, a first winding on two poles of said field structure for continuously impressing a magnetic flux pattern on the coating of said rotor corresponding to a first frequency within the passband of said transmission line, a plurality of message windings encompassing groups of four poles of said field structure, direct-current pulses selectively applied to any of said last-mentioned groups of four poles erasing the magnetic flux pattern corresponding to said first frequency and inducing in the coating of said rotor a magnetic pattern corresponding to a second frequency within the passband of said transmission line, a second winding on two poles of said field structure coupled to said transmission line having induced therein by the changing magnetic pattern on said rotor coating an electrical signal at said first and second frequencies, and said receiver comprising a hysteresis dynamo structure including a multipolar field structure and a smooth rotor coated with a magnetizable surface and rotating in synchronism with the rotor in said transmitter, a first winding on two poles of said last-mentioned field structure connected to said transmission line to receive said line electrical signal and induce in said last-mentioned rotor coating magnetic patterns corresponding to said first and second frequencies, and a plurality of message windings encompassing groups of four poles of said last-mentioned field structure, the magnetic pattern corresponding to said first frequency being incapable of inducing a direct-current output in any of said plurality of windings but the magnetic pattern corresponding to said second frequency inducing a direct-current output of usable amplitude.

3. An electromechanical frequency-shift data conversion device comprising a fixed stator structure having a plurality of evenly spaced salient poles, a plurality of individual windings encompassing groups of two and four of said stator poles, a smooth cylindrical rotor operable at synchronous speed within said stator, a magnetizable surface on said rotor, said individual windings encompassing groups of four poles of said stator when pulsed impressing a magnetic flux pattern on said surface corresponding to a given frequency determined by the pole spacing and when excited by said same magnetic pattern generating an output pulse, and said individual windings encompassing two poles of said stator being capable of effecting electrical to magnetic and magnetic to electric signal conversions with respect to the magnetic flux patterns on said rotor.

4. An electromechanical frequency-shift data conversion device according to claim 3 in which said individual windings encompassing groups of four poles on said stator are selectively pulsed according to the bits in a data word to record on said rotor a magnetic flux pattern at said given frequency for all marking bits and one of said individual windings encompassing two poles on said stator is an output winding for translating said last-mentioned flux pattern into an electrical signal at said given frequency.

5. An electromechanical frequency-shift data conversion device according to claim 4 in which another of said individual windings encompassing two poles on said stator in response to an applied electrical signal of a fixed frequency related to said given frequency by the ratio of an odd integer to the number two impresses a continuous magnetic flux pattern on said rotor corresponding to said fixed frequency, said fixed frequency then serving to encode spacing bits of a data word in said output winding.

6. An electromechanical frequency-shift data conversion device according to claim 4 in which said individual windings encompassing groups of four poles on said stator are output windings have induced therein unidirectional electrical pulses when excited by the magnetic flux pattern on said rotor corresponding to said given frequency and one of said individual windings encompassing two poles on said stator is an input winding for translating incoming electrical signals including said given frequency into a corresponding magnetic flux pattern on said rotor.

7. An electromechanical frequency modulator for binary data comprising a laminated field structure having a plurality of evenly spaced pole pieces, a smooth cylindrical rotor of magnetic material rotating within said field structure at a constant speed, an input winding on two of said pole pieces, a space frequency generator, means for applying the output of said space frequency generator to said input winding whereby the material in said rotor is saturated with a flux pattern corresponding to said space frequency, a plurality of additional input windings encompassing groups of four pole pieces on said field structure, a parallel data source for data words having a number of bits not exceeding the plurality of said additional input windings, means under the control of said data source for selectively and simultaneously pulsing said additional windings according to the marking and spacing bits in each data word, the spacing of the poles in said groups determining the mark frequency flux pattern induced in the magnetic material in said rotor and the amplitude of said pulses erasing the space frequency pattern under the pulsed winding, and a final read-out winding on two of said pole pieces for translating the resultant flux pattern in said rotor material into a two-frequency serial electrical signal.

8. An electromagnetic frequency modulator according to claim 7 in which said space frequency generator comprises an induction generator having a rotor driven at said constant speed.

9. An electromagnetic frequency modulator according to claim 8 in which a hysteresis induction motor drives said smooth rotor and said induction generator rotor on a common shaft at said constant speed 10. An electromechanical frequency demodulator for a two-frequency binary data signal comprising a two-frequency electrical data signal source, a laminated field structure having a plurality of evenly spaced pole pieces, a smooth cylindrical rotor of magnetic material rotating within said field structure at constant speed, an input winding on two of said pole pieces, means for applying the output of said source to said input winding to induce in said rotor material a flux pattern corresponding to the two frequencies in said data signal, a plurality of additional windings encompassing groups of four pole pieces on said field structure, the spacing between said pole pieces being equal to half the wavelength of one of the frequencies in said data signal, a utilization circuit for parallel data words, gating means responsive to the storing of complete data words in said rotor material for connecting said additional windings to said utilization circuit at the instant when the flux pattern on said rotor is directly under said pole-piece groups.

11. An electromechanical frequency translator comprising a multipolar laminated stator structure, a smooth cylindrical rotor having a magnetizable rotor rotating at a constant speed within said stator structure, one or more windings encompassing pairs of adjacent poles on said stator structure, an electrical signal applied to one of said last-mentioned windings inducing a corresponding magnetic flux pattern in said rotor material and a magnetic flux pattern in said rotor material inducing a corresponding electrical signal in said winding, and a plurality of further windings encompassing groups of four adjacent poles on said stator structure, an electrical pulse applied to one of said further windings inducing a magnetic flux pattern in said rotor material corresponding to a particular frequency determined by said constant speed and the spacing between adjacent poles and a magnetic flux pattern corresponding only to said particular frequency inducing an electrical pulse in said further windings.

12. An electromechanical frequency modulator comprising a common base, a first stator structure on said base serving as a field for an induction motor, a second stator structure on said base serving as a field for an alternating-current generator, a third stator structure on said base serving as an electromagnetic transducer, a common rotor having a magnetizable surface rotatably supported by said base within said stator structures, individual coils on said third stator structure to enable the imprinting of magnetic patterns on said rotor surface corresponding to applied electrical signals, means for connecting the electrical output of said second stator structure to a coil on said third stator structure to establish a reference frequency flux pattern in said rotor surface, said applied electrical signals selectively changing the last-mentioned flux pattern to correspond to a different frequency, and an output coil on said third stator for converting the flux patterns on said rotor surface into two-frequency electrical signals.

13. An electromechanical demodulator for two-frequency electrical signals comprising a common base, a first stator structure on said base serving as a field for an induction motor, a second stator structure on said base serving as an electromagnetic transducer, a common rotor having a magnetizable surface supported by said base within said stator structures, an input coil on said second stator structure to enable the imprinting of magnetic flux patterns on said rotor surface corresponding to said two-frequency electrical signals, and a plurality of individual output coils on said second stator structure encompassing groups of poles spaced according to the half-wavelength of one of said frequencies so that an electrical output pulse is induced in said output coils for that one frequency only.

14. A frequency-shift data transmitter comprising a smooth drum covered on its outer surface with magnetizable material, a stationary field structure enclosing said drum and including a plurality of equally spaced salient poles, a first winding encompassing one pair of said poles and serving as an output winding, a second winding encompassing a second pair of said poles and serving as a space winding, a plurality of additional windings each encompassing an individual group of four adjacent poles and serving as data bit windings, means for driving said drums at a synchronous speed, means for generating a sinusoidal wave having a wavelength equal to one and one-third times the spacing between adjacent poles on said field, means for continuously applying the output of said generating means to said second winding to record a magnetic pattern on said drum corresponding to the frequency of said sinusoidal wave, a source of message characters composed of a plurality of data bits in parallel, means for gating said data bits to said additional windings simultaneously to record on said drum for marking bits a magnetic pattern corresponding to a second frequency having a wavelength equal to twice the spacing between said poles, a transmission line connected to said first winding, and means for impressing the electrical signal induced in said first winding by the rotation of said drum on said transmission line to form a line signal in which spacing bits are encoded as the frequency of said sinusoidal wave and marking bits as said second frequency.

15. A frequency-shift data receiver comprising a smooth drum covered on its outer surface with magnetizable material, a stationary field structure enclosing said drum and including a plurality of equally spaced salient poles, a first winding encompassing a pair of said poles and serving as an input winding, a transmission line carrying data message characters in which marking bits are encoded on a first frequency and spacing bits are encoded on a second frequency, said first frequency having a wavelength equal to the spacing between said poles and said second frequency being one and one-half times the frequency of said first frequency, amplifying means for coupling said transmission line to said first winding, the gain of said amplifier being sufficient to record on said drum saturated magnetic patterns corresponding to said first and second frequencies, a plurality of additional windings each encompassing an individual group of four adjacent poles and serving as data bit output windings, the magnetic pattern repersenting said first frequency inducing in said additional windings a unipolar electrical pulse and the magnetic pattern representing said second frequency inducing no net electrical output, a utilization device for accepting message characters composed of a plurality of data bits in parallel, and gating means responsive to the storing of a complete message character on said drum and the alignment of the magnetic pattern therefor under said additional winding for coupling said additional windings to said utilization device.

References Cited in the file of this patent

UNITED STATES PATENTS

| | | |
|---|---|---|
| 2,696,420 | Roth | Dec. 7, 1954 |
| 2,805,279 | Walker | Sept. 3, 1957 |
| 2,831,058 | Finch | Apr. 15, 1958 |
| 2,876,058 | Kenosian | Mar. 3, 1959 |
| 3,023,269 | Maniere | Feb. 27, 1962 |